United States Patent [19]

Schwartz et al.

[11] 4,114,685
[45] Sep. 19, 1978

[54] METHOD AND APPARATUS FOR INCREASING HEAT TRANSFER EFFICIENCY

[75] Inventors: Jacob Schwartz, Arlington, Mass.; Victor A. Misek, Hudson, N.H.

[73] Assignee: Sanders Associates, Inc., Nashua, N.H.

[21] Appl. No.: 647,377

[22] Filed: Jan. 8, 1976

[51] Int. Cl.² .................. F28F 13/02; F28F 13/16
[52] U.S. Cl. .................................. 165/96; 62/3; 126/270; 219/10.81
[58] Field of Search .............. 165/1, 96; 62/3, 383; 219/10.81; 126/270, 271

[56] References Cited

U.S. PATENT DOCUMENTS

| | | | |
|---|---|---|---|
| 2,913,881 | 11/1959 | Garwin | 165/96 X |
| 3,224,485 | 12/1965 | Blomgren, Sr. et al. | 62/3 X |
| 3,224,497 | 12/1965 | Blomgren, Sr. et al. | 62/3X |
| 3,438,352 | 4/1969 | Brandon | 165/96 X |
| 3,448,791 | 6/1969 | Clark | 165/96 X |
| 3,526,268 | 9/1970 | Robinson | 165/1 |
| 3,724,930 | 4/1973 | Farmer | 62/3 X |
| 3,747,284 | 7/1973 | Lyczko | 165/96 X |
| 3,763,928 | 10/1973 | Derr | 165/96 X |
| 3,872,917 | 3/1975 | Blomgren, Sr. et al. | 165/1 |
| 3,938,345 | 2/1976 | Yamaga et al. | 165/1 X |
| 3,951,207 | 4/1976 | Baumann et al. | 165/133 |
| 3,980,855 | 9/1976 | Boudouris et al. | 219/10.81 |

Primary Examiner—Charles J. Myhre
Assistant Examiner—Sheldon Richter

Attorney, Agent, or Firm—Louis Etlinger; Robert K. Tendler

[57] ABSTRACT

A method and apparatus are provided for increasing the heat transfer efficiency of a heat exchanger by utilizing a high intensity RF field. Either an ion stream generated by the RF field or the RF field itself results in the efficiency increase and the rate at which the fluid acquires energy from the heat exchanger is enhanced to the extent that the boundary layer normally present at the walls of the heat exchanger which impedes the transfer of heat from the heat exchanger to the fluid breaks down during this process. The RF technique is utilized in one unique application for increasing the efficiency of solar energy receiver which operate at temperatures exceeding 1,500° F in that the system eliminates arcing which would occur due to the high temperatures involved, if electrostatic (D.C.) ion spray devices were used. Arcing elimination is achieved both by the use of RF energy and by shielding the RF electrode or probe from contact with the heat transfer fluid with a dielectric member through which the RF field penetrates. In one embodiment a broad spectrum high voltage RF signal is generated by a Tesla coil to produce the RF signal. Alternatively, pulsed high RF energy of a single frequency may be used. This energy may be generated by a conventional magnetron and may be transmitted by a wave guide with a reentrant cone at the front of the solar receiver so that both focused solar energy and the RF energy impinge on the heat exchanger from the same direction.

24 Claims, 9 Drawing Figures

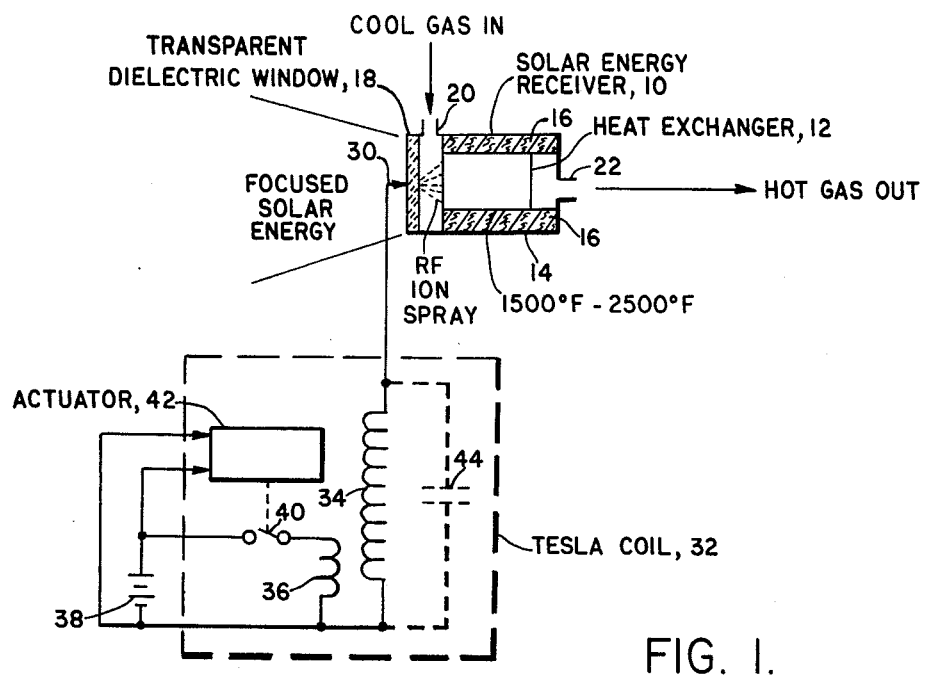
FIG. 1.
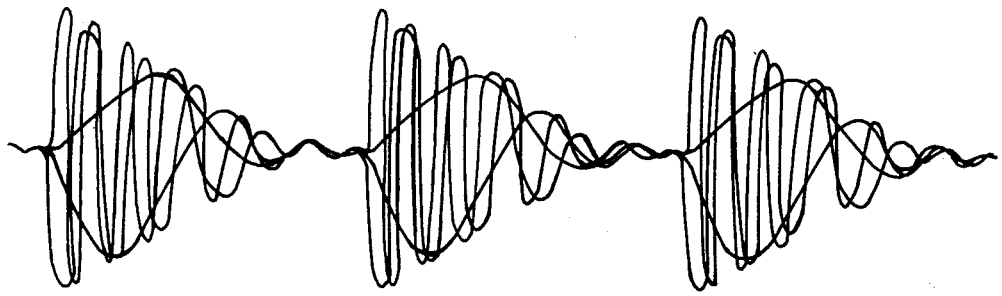
HV PULSED BROADBAND RF   FIG. 2.
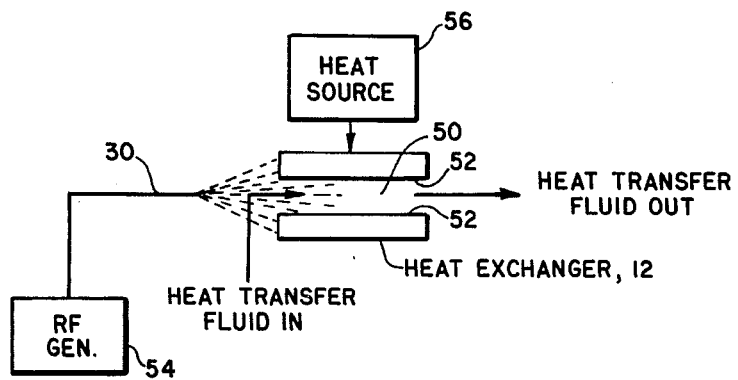
FIG. 3.

METHOD AND APPARATUS FOR INCREASING HEAT TRANSFER EFFICIENCY

FIELD OF INVENTION

This invention relates to efficiency enhancement for heat exchangers and more particularly to the use of RF energy for enhancing the efficiency of the heat exchanger.

BACKGROUND OF THE INVENTION

Electrostatic ion sprays have been utilized in the past for increasing the efficiency of various types of heat exchanger apparatus either for the purpose of cooling the apparatus or for the purpose of increasing efficiency. These types of systems are illustrated in U.S. Pat. Nos. 3,872,917 issued Mar. 25, 1975; 3,794,111 issued in Feb. 26, 1974; 3,862,391 issued Jan. 21, 1975; 3,757,079 issued Sept. 4, 1973; 3,735,175 issued May 22, 1973; 3,747,284 issued July 24, 1973; and 3,670,606 issued June 20, 1972, to Oscar C. Bloomgren, Sr., et al.

One of the problems in applying this technology to high temperature solar energy receivers is the problem of arcing between the electrodes and the heat exchanger used in the solar energy receiver when temperatures of, for instance, 1500° F. are exceeded. In order to achieve ion spray efficiency increases at 1500° F. and above it would be necessary to provide complicated control circuitry for sensing the condition preceeding arcing, and preventing the arcing by reducing the electrostatic voltage. The difficulty in such a control system centers around the non-uniformity of the flow of the heat transfer fluid, impurities in the heat transfer fluid, and the unpredictable nature of the heat transfer fluid at high temperatures.

As a solution to the above mentioned problem, a high intensity radio frequency (RF) field is generated instead of the electrostatic (D.C.) field. The term RF is used herein to include electromagnetic energy in a band between 1 KHz and $10^5$ MHz although this invention is not limited to this frequency band. In one embodiment of this invention an RF electrode or probe is placed in the vicinity of the heat exchanger utilized in the solar receiver and a dielectric shield in the form of a plate or other member is interposed between the electrode and the heat transfer fluid. When used with solar receivers having an impingement cooled window, this window can double as the dielectric shield. Because RF energy is utilized, an intense RF field penetrates through the dielectric shield to the fluid side of the dielectric barrier to either produce an ion spray or is utilized directly in breaking up the thin film boundary layer between the heat exchanger walls and the fluid in the heat exchanger which increases heat exchanger efficiency. It will be appreciated that if the dielectric shield were utilized with an electrostatic field, there would be no energy propagation through the dielectric shield. It will be further appreciated that the higher the frequency, the more transparent will be the dielectric shield to RF field penetration. The dielectric shield prevents arcing by preventing the possibility of establishing a single high-conductivity path through the fluid. In one embodiment the dielectric shield or barrier is transparent to light and serves as a window through which focused solar energy passes on its way to the heat exchanger.

It will be noted that in the prior art 60 cycle A.C. fields are used for enhancement of heat exchanger efficiency. However in these systems the heat exchanger is connected to one side of the A.C. generator and there is no net ion propagation towards the heat exchanger, but rather an oscillating field is established between the electrode and the heat exchanger. The subject system on the other hand eliminates a high conductivity return from the heat exchanger to the power source so that a net propagation direction is established.

One type of solar energy receiver to which this technique is especially applicable is described in a U.S. patent application entitled Solar Energy Conversion System, Ser. No. 612,434 filed Sept. 11, 1975 by Philip O. Jarvinen and assigned to assignee hereof. In this solar energy receiver the heat transfer fluid is a gas which is introduced between the heat exchanger and a quartz window from which point it passes through the heat exchanger. In one embodiment the heat exchanger is a silicon carbide honeycomb structure with channels running parallel to the optical axis of the system. The gas in this embodiment may be air and the exchange of heat from the heat exchanger to the air flowing through it is enhanced by virtue of the RF-generated ion spray which, according to one interpretation, breaks down a boundary layer between the heat exchanger walls and the gas flowing through the heat exchanger. While the subject invention is not limited to any one theory of operation, it is thought that the ion stream may produce acoustic shock waves which break up this layer, especially when the RF source is pulsed, and in one embodiment, a Tesla coil is used to achieve a high intensity pulsed RF field which propagates towards the heat exchanger. As is well known, a Tesla coil produces a broad spectrum of RF energy.

It is also possible to achieve increased heat exchanger efficiency with RF signals at a single frequency and high power microwave generators may be employed for this purpose. For microwave frequencies it is thought that the RF field may act directly on the boundary layer to break it up although ions may also be produced in the process.

Insofar as the receiver is concerned, solar energy is focused onto its heat exchanger through a transparent window which causes the temperature of the heat exchanger to rise. Typically the heat exchanger's temperature rises to between 1,500° F. and 2,500° F. In order to contain this heat, the heat exchanger is thermally insulated from the body of the receiver. Any energy radiated by the hot heat exchanger and not contained by the insulating material is reflected back into the heat exchanger by the walls of the receiver and the impingement cooled window, such that the heat exchanger acts like a black body receiver to trap all incoming solar energy.

The subject invention is not, however, limited to a solar energy receiver of the type described and in general the invention relates to the increase in efficiency of any heat exchanger by the provision of RF energy and/or RF-generated ions at the heat exchanger conduit which channels the fluid through the heat exchanger so that the transfer of energy from the walls of the heat exchanger to the fluid will be enhanced.

In an alternative embodiment, the Tesla coil RF energy source may be replaced with a microwave generator such as a magnetron, and a number of RF electrode configurations are provided for injecting the microwave energy. These configurations include coaxial cables with sharpened central conductors as electrodes, and waveguides with reentrant cones which permit the passage of sunlight to the heat exchanger. If waveguides having portions which permit entry of solar energy are used, they may be placed in front of the solar receiver without blocking the focused solar energy.

It is therefore an object of this invention to provide an improved solar energy receiver utilizing an RF field for the enhancement of heat exchange within the receiver.

It is another object of this inventions to provide ion spray efficiency increases in a high temperature environment by the utilization of RF energy and a dielectric shield to prevent arcing in which the shield is positioned between the electrode at which the high intensity RF field is generated and the heat transfer fluid.

These and other objects of the inventions will be better understood where in connection the following specification in conjunction with the following drawings wherein

BRIEF DESCRIPTION OF THE DRAWINGS

FIG. 1 is a schematic diagram of the subject invention as utilized with a solar energy receiver, in which a high intensity field is utilized and a dielectric transparent window is provided to prevent arcing, FIG. 2 is a waveform diagram of one of the signals from the Tesla coil of FIG. 1, FIG. 3 is a diagrammatic representation illustrating the utilization of RF energy for increasing the efficiency of the transfer of energy from a heat exchanger to a heat transfer fluid flowing therein.

DETAILED DESCRIPTION

Figure 4:
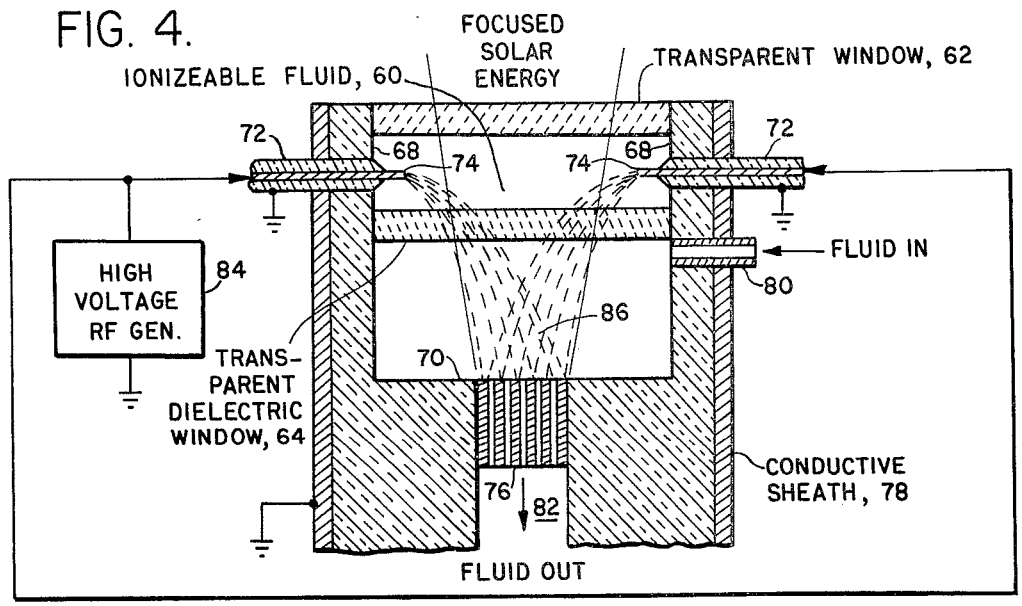
FIG. 4 is a sectional and diagrammatic representation of an RF field system in which an entrapped ionizeable fluid is located adjacent the RF electrodes.

Referring now to FIG. 1, a solar energy receiver 10 is illustrated as incorporating a heat exchanger 12 insulated and spaced from a housing 14 by thermal and electrical insulating material 16. One end of the housing is open and is sealed by a transparent dielectric window 18. Cool gas is introduced into the receiver at an input port 20 where it is utilized to cool the transparent dielectric window thereby preventing melting. The cool gas is then redirected through the heat exchanger and out an exit port 22.

In one embodiment the cool gas is the heat transfer fluid and may be air. The heat exchanger may be a honeycomb made of silicon carbide, metal or the like with channels therethrough. The cool gas after being directed to the heat exchanger passes through these channels and heat is transferred to the gas from the walls of its channels. Solar energy is focused through the transparent dielectric window onto the heat exchanger, which typically causes the temperature of the heat exchanger to rise to a range of between 1,500° F. and 2,500° F. Energy radiated from the hot heat exchanger in the form of infrared radiation is contained within the receiver housing by the transparent window which reflects this energy back to the heat exchanger while permitting passage of visible and UV sunlight to the heat exchanger. The window thus permits a type of "greenhouse"0 operation and as such the receiver, insofar as practical, functions as a black body receiver in which little energy is lost to obtain maximum efficiency.

With solar energy receivers of the type described, gas has been heated to temperatures in excess of 1,500° F. However, heat exchanger efficiencies can be increased with the use of an ion spray without the problem of arcing by the provision of high intensity RF field at a probe or electrode 30 which is located on the side of the transparent dielectric window opposite the side which is exposed to the heat transfer fluid. The probe or electrode is provided with a sharpened point for RF field concentration. In one embodiment a high voltage RF signal on the order of 10 KV is generated by a conventional Tesla coil 32 which includes step up transformer coils 34 and 36, a source of power, herein indicated by battery 38, and a means of rapidly interrupting and applying power to coil 36. This means includes in one embodiment a switch 40 and a switch actuator 42 powered by battery 38. Actuator 42 and switch 40 are in the form of a vibrating reed type supply. The Tesla coil inherently has some capacitance illustrated by dotted capacitor 44. It is well known that the output signal of the Tesla coil covers a frequency spectrum from a few thousand hertz to one megahertz, and it will be appreciated that the voltage supplied by the Tesla coil is dependent on the relative sizes of coils 34 and 36.

As can be seen from the embodiment of FIG. 1, one end of coil 34 is coupled to electrode 30. It has been found that at least a portion of the RF field propagating from the electrode propagates in the direction of the heat exchanger and this is effective in increasing the efficiency of the heat exchanger. Moreover, the higher the RF signal frequency the less opaque will be the dielectric shield to the RF signal.

As can be seen from the waveforms of FIG. 2, the output from the Tesla coil is a series of multifrequency RF pulses in the form of damped oscillations which decay between the actuations of switch 40. This provides decaying pulses of RF energy to electrode 30 which in turn are transmitted through the dielectric window, in one case to form an ion spray. While a constant amplitude CW RF-generated spray may be utilized to increase the heat exchanger efficiency, it is thought that a decaying pulsed waveform having a broad frequency spectrum produces ion spray shock waves which are particularly effective in the breakdown of the aforementioned boundary layer between the heat transfer fluid and the channels of the heat exchanger.

In any event, the dielectric member in the form of a window prohibits arcing between the heat exchanger and the electrode by preventing a single high conductivity path from forming, thereby precluding the necessity of utilizing complicated arc suppressing circuitry, which would be necessary if the electrode were not shielded from the heat transfer fluid. As an alternative, the dielectric shield may be in the form of a dielectric coating on the electrode.

In a generic aspect, as illustrated FIG. 3, the process may be characterized as one involving a heat exchanger, heat transfer fluid and a high intensity localized and propagating RF field which under one interpretation ionizes the fluid via electric field breakdown over a number of low electrical conductivity paths to produce the ion spray. The heat exchanger may be characterized by a channel 50 formed by walls 52. In this figure the RF source is generalized at 54. Again, in generality, a heat source 56, which may be any of a number of heat sources, couples energy to walls 52 of the heat exchanger. It will be appreciated that the RF-generated ion spray exists because of the presence of an ionizeable fluid in the vicinity of electrode 30 which fluid also exists in channel 50. The ions are formed from atoms or molecules of this fluid, some of which are partially ionized due to the high intensity RF field existing at the electrode.

RF arcing does not occur as readily as electrostatic arcing because there is an absence of avalanche due to the extremely rapid field reversal which prevents the chain reaction mechanism typical of avalanche breakdown. Avalanche is inhibited because the extremely rapid field reversal prevents a molecule accelerated during one half cycle to continue its acceleration in this direction, thereby on the average preventing its collision with another molecule.

Under another interpretation, the RF field generated at electrode 30 propagates in heat exchanger channel 50 and in so doing directly breaks up the aforementioned boundary layer. This waveguide type effect is more pronounced at the high RF signal frequencies and will be more fully described in connection with FIG. 9. However, whether the RF-generated ion spray effect or a direct RF effect is dominant, the heat transfer efficiency of a heat exchanger is significantly enhanced when an RF probe is utilized in the vicinity of the heat exchanger.

Referring now to FIG. 4, an embodiment is now illustrated in which the probes or electrodes are exposed to a confined ionizeable fluid. In this embodiment an ionizeable fluid 60 is confined between two transparent windows, 62 and 64 respectively, and side walls 68 of insulating material 70. The chamber defined by windows 62 and 64 and walls 68 is sealed and electrodes or probes generally indicated by reference character 72, formed by high voltage coaxial cable, penetrate into this chamber. Central electrodes 74 are sharpened at the ends that the high intensity RF field is produced.

The receiver includes a heat exchanger 76 and insulating material 70 is surrounded by a conductive sheath 78 which is grounded as illustrated. As will be described later, the conductive shield acts in part as a waveguide, and to the extent that standing waves exist in the waveguide, the aforementioned film is broken up and heat transfer efficiency is enhanced. An input port 80 is provided between window 64 and heat exchanger 76 and heat transfer fluid such as air is introduced at this port. The air from the impingement window 64 is then redirected through the channels of the heat exchanger to an exit port generally indicated by a reference character 82. A high voltage RF generator 84 is coupled to the central conductors of the high voltage coaxial cables.

In operation, gas is introduced into the receiver under pressure and solar energy is focused onto the heat exchanger through windows 62 and 64. Under the first mentioned interpretation, an ion spray is established over a number of low electrical conductivity paths in the ionizeable fluid 60 via the propagation of the RF energy away from the electrodes. Each of these paths provides a simulated electrode at window 64 which in turn provides a high intensity RF field at the interface between the fluid and the window which propagates towards the heat exchanger. This in turn partially ionizes the fluid and an ion spray such as that illustrated by dotted lines 86 is produced in the form of further low conductivity paths.

The purpose of including a confined ionizing fluid is to provide uniformity of the ionizing fluid and to provide a lack of turbulence in the vicinity of the probes or electrodes. This in turn permits simplification in the design the high voltage RF generator in that the generator may be set to a predetermined voltage.

Figure 5:
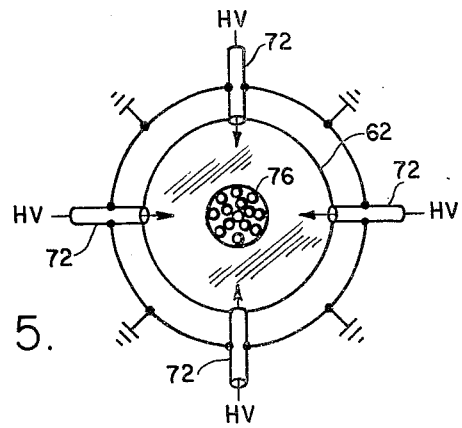
FIG. 5 is a schematic diagram of the electrical circuit for the electrodes of FIG. 4.

A schematic diagram illustrating a four probe or four electrode configuration is illustrated in FIG. 5. In this diagram corresponding elements between FIG. 4 and FIG. 5 are provided with like reference characters.

Figure 6:
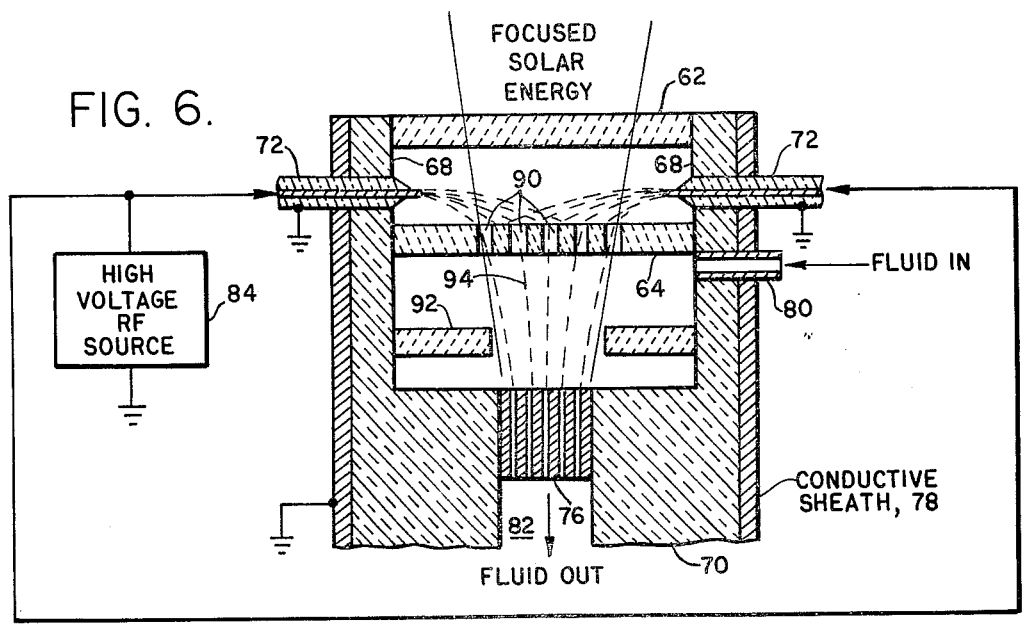
FIG. 6 is a sectional and diagrammatic representation of an embodiment utilizing a perforated dielectric member.

Referring now to FIG. 6, window 64 of FIG. 4 has been perforated as illustrated by channels 90 and is hereinafter referred to as window 64'. All other receiver parts are the same as those in FIG. 4, and are labeled with corresponding reference characters. Additionally, an apertured window 92 is provided between window 64' and heat exchanger 76 to provide channeling of the field to the heat exchanger and for providing further reflection of energy radiated by the heat exchanger back towards the heat exchanger.

In this embodiment, fluid from input port 80 is allowed to penetrate into the chamber defined by windows 62 and 64' and walls 68 such that a portion of this fluid surrounds the electrodes or probes 72. The ion spray developed in this embodiment, as illustrated by dotted lines 94 follows low conductivity paths through the channels. While this embodiment does not completely isolate the probes or electrodes from the fluid, it does provide that, though arcing can occur in this embodiment, the likelihood of arcing is lessened because the probes are, in effect, removed from the high temperature region of the heat exchanger. The apertures in the dielectric material also descrease the amount of power necessary for generating the ion spray since this is a one-step as opposed to a two-step process. What has therefore been provided in this embodiment is a means for reducing the necessary power, and provides for removal of the probes or electrodes to a cooler area as a means for reducing arcing. This results in an effective method of arc suppression, although it will be understood that under certain circumstances arcing can occur. Thus complicated arc suppression circuits need not be utilized in this embodiment. It will also be appreciated that by utilizing the apertured dielectric barrier, electrostatic fields may be successfully utilized, and the reasons that these D.C. systems are suitable without arc suppression circuitry are the same as those for the RF case.

Figure 7:
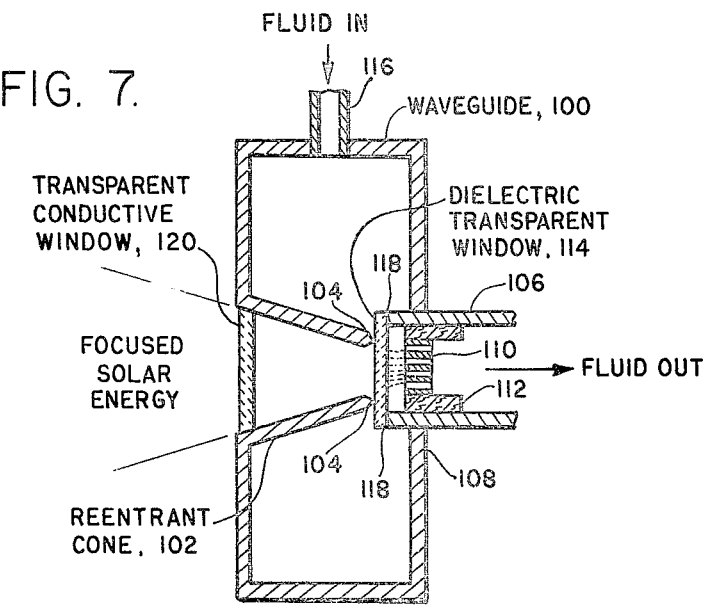
FIG. 7 is a sectional and diagrammatic representation of an embodiment utilizing a reentrant cone waveguide.

Referring now to FIG. 7, an embodiment is illustrated in which the RF energy is transmitted to the vicinity of the heat exchanger by a special purpose waveguide 100 which includes a reentrant portion folded in on itself in the form of a truncated tapered device 102 hereafter referred to as a reentrant cone. The cone has a circular sharp edge electrode 104 which concentrates the RF field. In this embodiment the solar receiver, herein designated by reference character 106, is located through a wall 108 of the waveguide opposite the end of the reentrant cone and is axially aligned therewith. The receiver includes a heat exchanger 110 surrounded by insulating material 112 and also includes a dielectric transparent window 114 which is positioned between the sharp pointed end of the reentrant cone and the heat exchanger. In this embodiment it is not necessary that window 114 be sealed to the receiver housing, and in this embodiment heat transfer fluid is introduced into the waveguide at an input port 116 and completely floods the housing thereby both cooling the housing and window 114. As illustrated, window 114 is sealed to the small end of the truncated cone and is supported by an apertured wall 118 of the receiver housing, with the apertures permitting ready access of the fluid within the waveguide to window 114 and heat exchanger 110.

In operation, the electromagnetic field within the waveguide is concentrated at the small end of the reentrant cone at which point a high intensity RF field is produced which in one case partially ionizes the heat transfer fluid between window 114 and heat exchanger 110. Note that resonance helps get a higher max.ε field for a given input power level.

In order for the reentrant cone aperture not to leak microwave energy into the surrounding environment its aperture is formed such that the circumference of the aperture is less than one wave length of the RF signal employed. As such the aperture of the truncated cone said to be beyond the cut-off at the operating wave length of the system. This insures that little of the microwave energy will be lost through the aperture.

While in the embodiment illustrated in FIG. 7, a dielectric transparent window is illustrated, it will be appreciated that arcing becomes less and less of a significant problem as the frequency of the RF energy increases. It is therefore possible to completely eliminate window 114, although some means of sealing the fluid within the waveguide is necessary. This means may conveniently be a transparent electrically conductive window 120 which both serves the purpose of forming a fluid seal while at the same time prohibiting RF leakage. It will be appreciated that the transparent conductive window 120 is electrically bonded to the reentrant cone of the waveguide as illustrated. It will also be appreciated that transparent conductive window 120 may be utilized in the subject system whether or not dielectric transparent window 114 is utilized.

Thus the use of the reentrant cone permits solar energy to be focused onto the heat exchanger by virtue of the passage of this energy through the waveguide. This enables the utilization of a waveguide type transmission line for the high voltage RF energy while at the same time providing a unique circular electrode.

Figure 8:
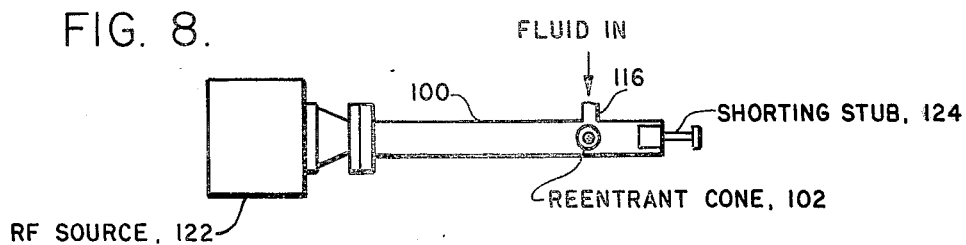
FIG. 8 is a diagrammatic front view of apparatus utilizing the reentrant cone waveguide of FIG. 7.

Referring to FIG. 8, a diagrammatic front view of the subject system illustrates an RF source 122 coupled to waveguide 100 which carries reentrant cone 102. A conventional shorting stub 124 is provided at the other end of this waveguide. This shorting stub provides an improved impedance match between the RF source and the ion spray region. A double stub tuner may be used in lieu of this to provide a more exact match. This stub also forms a fluid tight seal such that the fluid in the waveguide will be forced through the heat exchanger. Input port 116 is also illustrated diagrammatically in this Figure.

Figure 9:
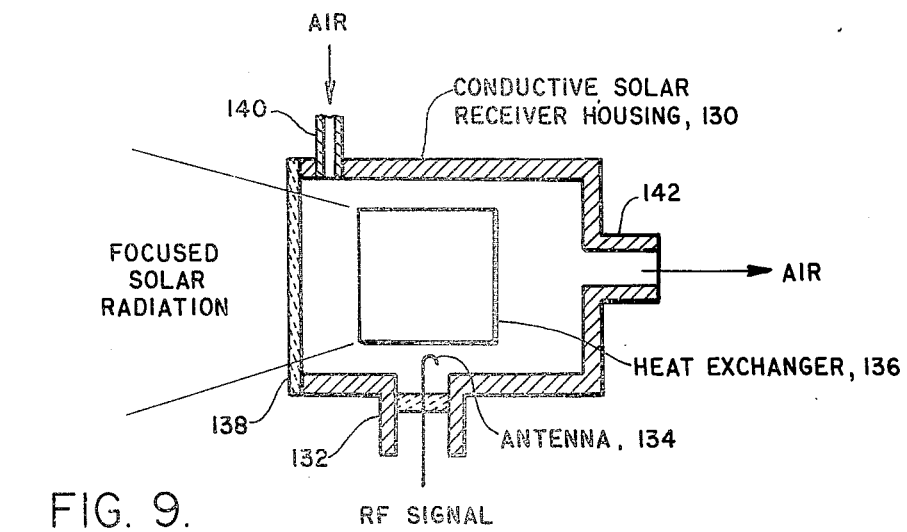
FIG. 9 is a diagram of a solar receiver in which RF energy propagates for heat transfer efficiency enhancement.

Referring now to FIG. 9, an embodiment is shown where the RF energy is utilized directly to break up the aforementioned boundary layer film by virtue of setting up standing waves which propagate in a microwave cavity formed by the receiver itself.

In this embodiment a conductive solar receiver housing 130 is configured to form a waveguide having an input port 132 through which an antenna 134 protrudes. A heat exchanger diagrammatically illustrated at 136 is centrally located in the housing and solar energy is focused through a window 138 onto the heat exchanger. Housing 130 is provided with a fluid input port 140 and a fluid output port 142.

The microwave cavity formed by housing 130 is tuned to enable the propagation of standing waves in the cavity. These standing waves can also exist within the channels of the heat exchanger. RF induced shock waves can therefore exist within these channels to break up the aforementioned boundary layer. Even if standing waves are not set up, the RF energy in the receiver housing will have some effect on the boundary layer. Heat exchanger 136 can also be designed such that its channels themselves form microwave cavities, depending on the size of the channels, their configuration and the dielectric characteristic of the heat transfer fluid utilized.

It will be appreciated that what has been provided is an apparatus for increasing the efficiency of a heat exchanger by utilizing a high intensity RF field technique in which various configurations are illustrated. The subject method and apparatus is uniquely applicable to high temperature environments in which arcing is prevented by the interposition of a dielectric member between the RF electrode and the heat transfer fluid.

Although a specific embodiment to the invention has been described in considerable detail for illustrative purposes, many modifications will occur to those skilled in the art. It is therefore desired that the protection afforded by Letters Patent be limited only by the true scope of the appended claims.

We claim:

1. Apparatus for enhancing the efficiency of a heat exchanger having a fluid conducting and confining surface and a fluid flowing in a pre-determined direction therein, comprising:
   means for establishing an RF field within said fluid such that no stationary oscillating field is set up within the fluid and for establishing a net ion propagation in said pre-determined direction.

2. Apparatus for enhancing the efficiency of the heat exchanger having a fluid conducting surface comprising means for establishing an RF field adjacent said surface, said means for establishing an RF field including an RF signal generator and means for pulsing the output of said RF signal generator thereby to produce RF induced shock waves at said fluid conducting surface.

3. Apparatus for enhancing the efficiency of a heat exchanger having a fluid conducting surface comprising:
   means for establishing an RF field adjacent said surface and, means for preventing a return path from said heat exchanger to said RF field establishing means, such that said heat exchanger is free floating with respect to said RF field establishing means.

4. The apparatus of claim 3 wherein said means for establishing and RF field includes an RF signal generator and means for pulsing the output of said RF signal generator thereby to produce RF induced shock waves at said fluid conducting surface.

5. Apparatus for increasing the heat transfer efficiency of a heat exchanger comprising:
   a heat exchanger having at least one channel through which an ionizeable heat transfer fluid under pressure is introduced,
   means for introducing said heat transfer fluid into said channel, means for subjecting said fluid to an RF field, including an electrode adjacent said channel, and dielectric barrier means interposed between said electrode and said fluid whereby arcing from said electrode is suppressed.

6. The apparatus of claim 5 wherein said dielectric barrier means includes a dielectric coating on said electrode.

7. The apparatus of claim 5 wherein said electrode is in the form of coaxial cable having a central conductor protruding from one end thereof.

8. The apparatus of claim 5 wherein said means for subjecting said fluid to an RF field includes a microwave generator, a waveguide coupled thereto, and means at said waveguide for concentrating the microwave energy therein to a limited region in space.

9. The apparatus of claim 8 wherein said concentrating means includes a truncated tapered device.

10. The apparatus of claim 5 wherein said means for subjecting said fluid to an RF field includes a pulsed RF source.

11. The apparatus of claim 10 wherein said pulsed RF source includes a Tesla coil.

12. The apparatus of claim 10 wherein said pulsed RF source includes means for generating signals at a number of different frequencies.

13. The apparatus of claim 5 wherein said dielectric barrier means includes a flat thin member.

14. The apparatus of claim 13 wherein said flat thin member is an optically transparent plate.

15. The apparatus of claim 13 wherein said flat thin member includes a limited number of apertures and further including means for spacing said electrode from said apertures.

16. Apparatus for increasing the heat transfer efficiency of a solar energy receiver having a heat exchanger onto which solar radiation is focused, an optically transparent window positioned at the end of the heat exchanger onto which solar energy is focused, and an ionizeable heat transfer fluid between said window and said heat exchanger, comprising:

means for generating an intense RF field at at least one location adjacent said window on the side thereof away from said heat exchanger.

17. The apparatus of claim 16 wherein said RF field generating means includes an RF source, an electrode adjacent said window and means for coupling the output of said RF source to said electrode.

18. The apparatus of claim 17 wherein said solar energy receiver includes an electrically conductive housing which acts as a waveguide.

19. The apparatus of claim 17 wherein said window includes a limited number of apertures.

20. The apparatus of claim 17 and further including an optically transparent second window spaced from said first mentioned window, means for forming a sealed chamber between said first and second windows, means for positioning said electrode in said sealed chamber spaced from said first mentioned window, and an ionizeable fluid in said sealed chamber.

21. The apparatus of claim 17 and further including an optically transparent second window spaced from said first mentioned window, and means for sealing the periphery of said windows, said first mentioned window having a limited number of apertures.

22. Apparatus for increasing the heat transfer efficiency of a solar energy receiver having a heat exchanger onto which solar radiation is focused and an ionizeable heat transfer fluid pumped through said heat exchanger, comprising:

a microwave generator, a waveguide having one end coupled to said microwave generator, means for introducing said heat transfer fluid into said waveguide, means for impedance matching the RF source to the ion spray which acts as a load, and for sealing the other end of said waveguide, means for exposing an input port of said heat exchanger in said waveguide, a truncated tapered device positioned in said waveguide opposite the location of the exposed portion of said heat exchanger, with the small end pointing in the direction of said heat exchanger, and optically transparent means for sealing said truncated tapered device, whereby focused solar radiation may pass through said truncated tapered device to said heat exchanger.

23. The apparatus of claim 22 wherein said transparent sealing means is electrically conductive.

24. The apparatus of claim 22 wherein said transparent sealing means is a dielectric material and further including means for positioning said transparent sealing means between the small end of said truncated tapered device and the fluid in said waveguide.

* * * * *